United States Patent [19]
Weigl et al.

[11] Patent Number: 5,969,597
[45] Date of Patent: Oct. 19, 1999

[54] METHOD FOR PREVENTING MISUSE OF TRANSPONDERS LEFT INSIDE A VEHICLE

[75] Inventors: Andreas Weigl, Linkenheim-Hochstetten; Peter Hauler; Karl-Ernst Weiss, both of Ettlingen; Uwe Feuchter, Stuttgart; Clemens Schroff, Ubstadt-Weiher; Tobias Klaiber, Illingen-Schuctzingen; Thomas Riehemann, Buehlertal, all of Germany

[73] Assignee: Robert Bosch GmbH, Stuttgart, Germany

[21] Appl. No.: 09/133,533

[22] Filed: Aug. 13, 1998

[30] Foreign Application Priority Data

Aug. 16, 1997 [DE] Germany ............ 197 35 658

[51] Int. Cl.6 .................................................. B60R 25/10
[52] U.S. Cl. ............ 340/426; 340/438; 340/825.31; 340/825.54; 340/825.69; 70/257; 180/287
[58] Field of Search ............................. 340/426, 430, 340/428, 438, 439, 825.31, 825.69, 825.54; 70/257; 180/287

[56] References Cited

U.S. PATENT DOCUMENTS

| | | | |
|---|---|---|---|
| 4,670,746 | 6/1987 | Taniguchi et al. | 340/825.31 |
| 4,761,645 | 8/1988 | Mochida | 340/825.31 |
| 5,552,789 | 9/1996 | Schuermann | 342/42 |
| 5,561,420 | 10/1996 | Kleefeldt et al. | 340/825.31 |
| 5,774,060 | 6/1998 | Ostermann et al. | 340/825.31 |

FOREIGN PATENT DOCUMENTS

| | | |
|---|---|---|
| 0523602A1 | 1/1993 | Germany . |
| 0523602B1 | 1/1993 | Germany . |
| 41 23 654 | 1/1993 | Germany . |

*Primary Examiner*—Jeffery A. Hofsass
*Assistant Examiner*—Toan N. Pham
*Attorney, Agent, or Firm*—Kenyon & Kenyon

[57] ABSTRACT

A method for preventing misuse of a transponder left inside a vehicle, which is part of a keyless vehicle access system and coacts with a control system for access and driving authorization located in the vehicle. The control system emits, in response to a locking command, a check signal by way of which it is ascertained whether transponders are still located in the vehicle interior after locking. Transponders which are detected as being located in the vehicle interior after locking are recorded in a memory associated with the control system. Upon a subsequent legitimate access to the vehicle, transponders that are not again detected in the interior are inhibited.

6 Claims, 2 Drawing Sheets

METHOD FOR PREVENTING MISUSE OF TRANSPONDERS LEFT INSIDE A VEHICLE

FIELD OF THE INVENTION

The present invention relates to a method for preventing misuse of transponders left inside a vehicle.

BACKGROUND INFORMATION

German Published Patent Application No. 41 23 654 A1 describes a known method to prevent an unauthorized person from being able to use a transponder that has been forgotten in a vehicle to start the vehicle. In this known method, features are provided with which the vehicle is locked only if the transponder is definitely located outside the vehicle. Detection of the transponder position inside or outside the vehicle is accomplished with two antennas, of which one is directed toward the interior and the other toward the exterior. The fact that unlocking is possible only if the transponder signal arrives via the antenna directed toward the exterior ensures that the vehicle cannot easily be put into operation if the transponder was left inside the vehicle. Unauthorized starting of the vehicle is possible, however, if a transponder left behind in the vehicle comes into the possession of an unauthorized person via a break-in into the vehicle, and is used by that person. In addition, multiple authorized transponders are usually allocated to vehicles, so that even if care has been taken that the most recently used transponder is located outside the vehicle, it is possible for a further authorized transponder to be located in the vehicle; in the event of a break-in, it would then allow the vehicle to be started.

SUMMARY OF THE INVENTION

An object of the present invention is to provide a method for operating a non-contact vehicle access system which ensures that unauthorized use of a vehicle is not possible even if an authorized transponder has been left behind in the vehicle.

According to the present invention, to secure transponders left behind in the vehicle, the transponders are recorded when the vehicle is locked. Only if the recorded transponders still located in the vehicle when the next correct vehicle unlocking operation occurs, is further utilization of those transponder possible. The method of the present invention operates irrespective of the number of transponders allocated to a vehicle, and allows controlled inhibition of transponders used in authorized fashion. In an advantageous development of the method according to the present invention, a system which monitors forced entry into the vehicle interior is provided. If an irregular attempt at access is detected, all recorded transponders located in the vehicle are inhibited.

DETAILED DESCRIPTION

Figure 1:
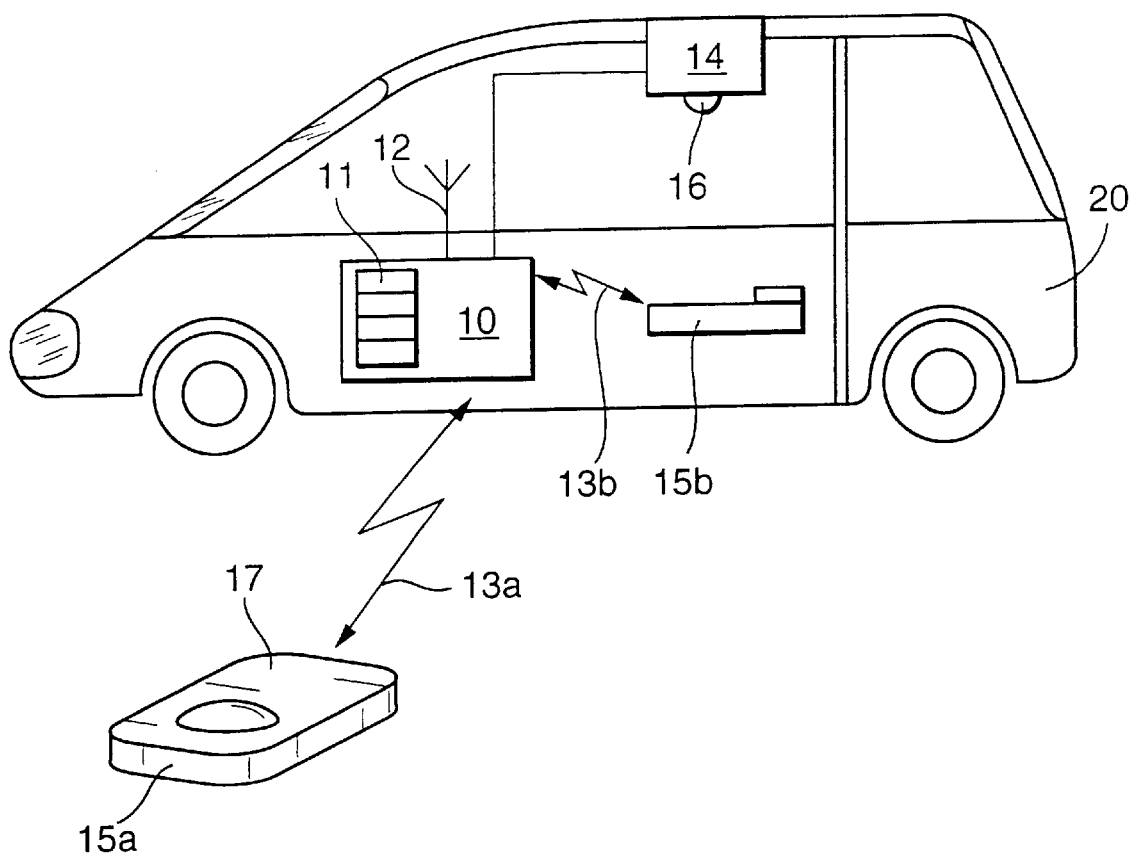
FIG. 1 shows a vehicle equipped with an access system which operates in keyless fashion according to the present invention.

FIG. 1 shows a vehicle 20 equipped with an access control system. The access control system includes a control system 10 that is arranged in the vehicle 20 for access and driving authorization. Control system 10 checks a vehicle user's authorization to use the vehicle. The access control system also includes a plurality of transponders, referred to in the exemplary illustration of FIG. 1 with reference characters 15a and 15b. Transponders 15a, 15b are in signal-based communication with control system 10 via signal paths 13a, 13b. Multiple transponders 15a, 15b, each of which is authorized to start the vehicle 20, are generally allocated to a single vehicle. To receive and emit signals from and to transponders 15a, 15b, control system 10 has one or more antennas 12 with which both signal paths 13a outside the vehicle, and signal paths 13b in the interior of the vehicle, can be implemented. Control system 10 furthermore has a memory 11 in which data concerning transponders 15a, 15b can be stored. Also connected to control system 10 is a vehicle monitoring system 14 which serves to detect any unauthorized entry into the vehicle interior and advantageously has a device 16 for detecting glass breakage and/or movement inside the locked vehicle interior.

Figure 2:
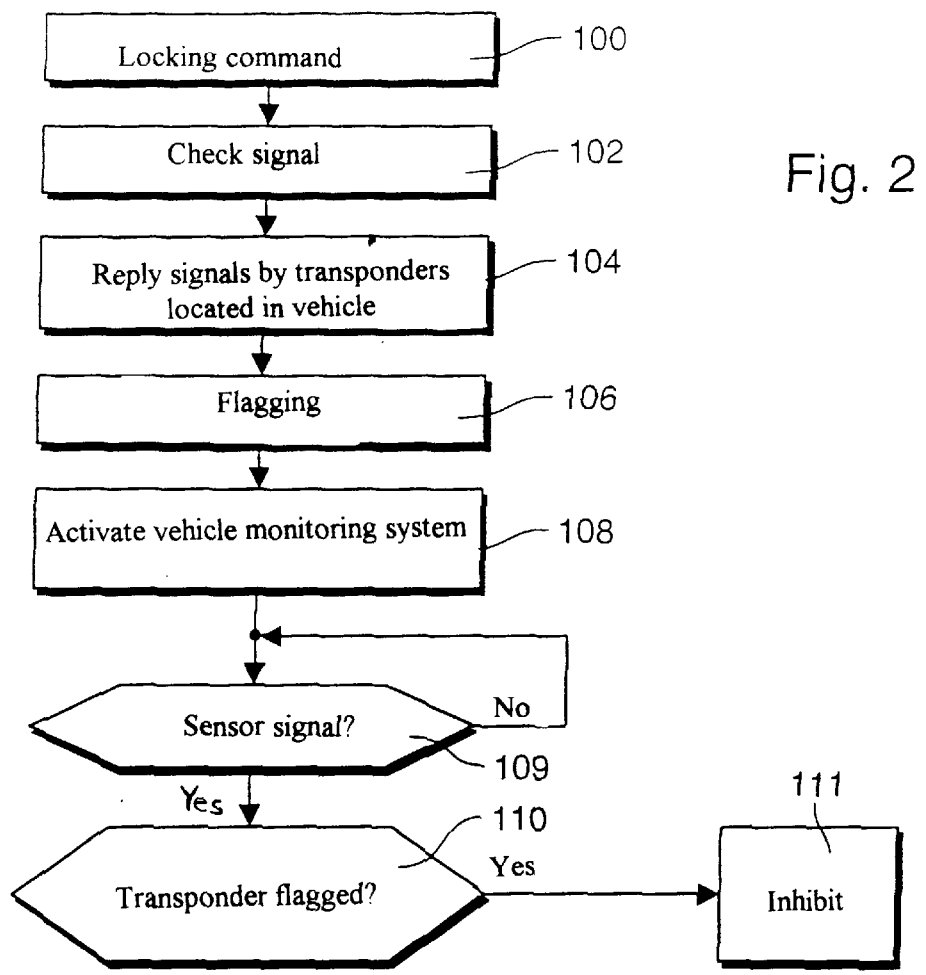
FIG. 2 shows a flow chart representing the steps of the method according to the present invention.
Figure 2:
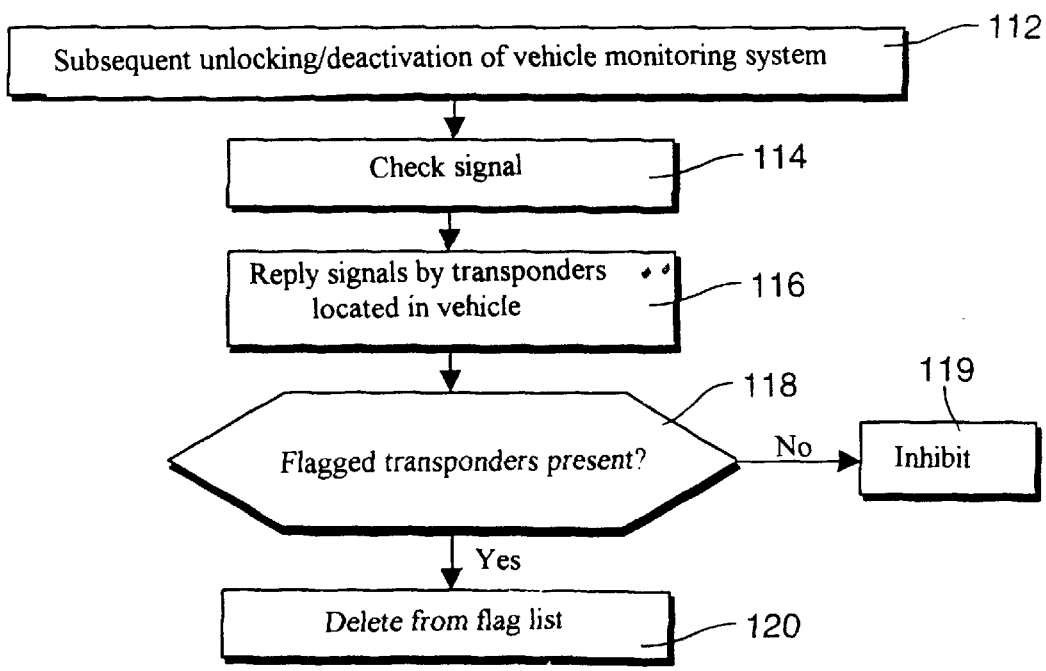

The operation of access control system 10 will be explained below with reference to the flow chart in FIG. 2. It is assumed that an authorized user is present in vehicle 20, and wishes to leave it after completing operation thereof. During or directly after the process of leaving the vehicle, a signal exchange occurs between transponder 15a being carried by the user and control system 10 by way of the switches associated therewith, either automatically or as initiated by the user (for example by actuating a door handle). Access control system 10 generates a locking command 100 for transponders 15a, 15b authorized for the vehicle. Control system 10 thereupon transmits a check signal, via antenna 12, into the interior of vehicle 20, which causes any transponder located in the vehicle (represented collectively by transponder 15b) to emit a reply signal (step 102). If transponder 15b is located in the vehicle interior, transponder 15b replies by sending back a reply signal which uniquely characterizes the particular transponder 15b (step 104). From the reply signals received from each transponder 15b left inside vehicle 20, control system 10 identifies each transponder 15b left behind in the interior of vehicle 20, and flags each transponder 15b by way of a corresponding entry in memory 11 (step 106). Each transponder 15a that is outside the vehicle interior is not flagged in memory 11.

Vehicle monitoring system 14 is then switched to active mode (step 108). Until it is deactivated, vehicle monitoring system 14 monitors the vehicle interior for break-in attempts (step 109). If one of sensors 16 of vehicle monitoring system 14 responds and signals an attempted break-in, control system 10 checks whether transponder 15b is flagged in memory 11 as being present in the vehicle (step 110). If so, it inhibits each flagged transponder 15b (step 111). Since transponder 15a, which was not present in the interior of vehicle 20 to receive the check signal form control system 10, is not flagged in memory 11, it remains uninhibited. With respect to each transponder 15b, it is thereafter no longer possible to gain regular access to the vehicle and start it using transponder 15b which was left in the vehicle.

Vehicle monitoring system 14 is deactivated by way of an unlocking command performed with a valid transponder 15a at the next access to the vehicle (step 112). After receiving the unlocking command, control system 10 checks whether transponders 15b are flagged in memory 11 as being present in the vehicle (step 114). If so, it once again transmits a check signal which causes transponders 15b located in vehicle 20 to emit a reply signal (step 114). Transponders 15b located in vehicle 20 reply correspondingly by sending back a uniquely characterizing reply signal to control system 10 (step 116). The latter determines, from the reply signals, the transponders 15b located in the vehicle, and compares them with each transponder 15b flagged in memory 11. Memory flags for transponders 15b that were again detected as being present when the check was repeated are then deleted (step 120). Each transponder 15b for which there is a flag in memory 11, but which were not detected as being present in the vehicle in response to the check signal in step 114, are inhibited (step 119). The inhibition can be accomplished easily by way of a further corresponding entry in memory 11.

While retaining its basic idea, the concept described above offers a great deal of leeway for other embodiments, for example in terms of the type of signals used or the manner of their generation. For example, radio, ultrasonic, or optical signals, in coded or uncoded form, can be used for signal paths 13a, 13b. Additional features can be provided in conjunction with the inhibition of each transponder 15b, for example independent transmission of an alarm signal. In addition, a locking/unlocking command can be executed immediately during the check for each transponder 15b present in the vehicle interior, or only thereafter. The proposed concept is moreover suitable not only for transponders, but in general for remote controls communicating with a vehicle control device.

What is claimed is:

1. A method for preventing a misuse of a transponder left inside a vehicle, the transponder being part of a keyless vehicle access system and being responsive to a control system located in the vehicle for providing an access and a driving authorization to the vehicle, the method comprising the steps of:

in response to a locking command, causing the control system to emit a check signal to determine whether the transponder is located in an interior of the vehicle after a locking of the vehicle; and recording in a memory associated with the control system an identity of the transponder if the transponder is determined to be located in the interior of the vehicle after the locking of the vehicle.

2. The method according to 1, further comprising the steps of:

in response to an unlocking command, causing the control system to emit the check signal to determine whether the transponder is located in the interior of the vehicle after an unlocking of the vehicle;

comparing an identity of the transponder determined to be located in the interior of the vehicle after the unlocking of the vehicle with the identity of the transponder recorded in the memory; and deleting from the memory a record of the identity of the transponder recorded in the memory if the identity of the transponder determined to be located in the interior of the vehicle after the unlocking of the vehicle corresponds to the identity of the transponder recorded in the memory.

3. The method according to claim 2, further comprising the step of:

causing the control system to prevent an operation of the vehicle if the identity of the transponder recorded in the memory is not detected again after the unlocking command.

4. The method according to claim 1, wherein a vehicle monitoring system is associated with the control system, and wherein the method further comprises the step of:

causing the control system to inhibit the transponder if the transponder is determined to be located in the interior of the vehicle after the locking of the vehicle and if the vehicle monitoring system detects an irregular entry into the vehicle.

5. The method according to claim 2, wherein the control system emits the check signal only if the identity of the transponder is recorded in the memory.

6. An arrangement for preventing a misuse of a keyless vehicle access system associated with a vehicle, comprising:

a transponder capable of being carried by a user for electronic identification; and a control system arranged in the vehicle and checking an access authorization and a driving authorization of a user, the control system including:

a device for emitting a check signal to identify each transponder located in an interior of the vehicle, and a memory for recording an identity of each transponder detected as being present in the interior of the vehicle.

* * * * *